(12) United States Patent
Kimura

(10) Patent No.: US 7,111,541 B2
(45) Date of Patent: Sep. 26, 2006

(54) CUTTING DEVICE

(75) Inventor: Kiyoshi Kimura, Fujisawa (JP)

(73) Assignee: Kabushiki Kaisha Ogura, Kenagawa-ken (JP)

( * ) Notice: Subject to any disclaimer, the term of this patent is extended or adjusted under 35 U.S.C. 154(b) by 119 days.

(21) Appl. No.: 10/520,256

(22) PCT Filed: Aug. 6, 2003

(86) PCT No.: PCT/JP03/10018

§ 371 (c)(1),
(2), (4) Date: Jan. 6, 2005

(87) PCT Pub. No.: WO2004/014590

PCT Pub. Date: Feb. 19, 2004

(65) Prior Publication Data

US 2006/0162525 A1    Jul. 27, 2006

(30) Foreign Application Priority Data

Aug. 8, 2002   (JP) .............................. 2002-231848

(51) Int. Cl.
*B26D 7/26* (2006.01)
(52) U.S. Cl. ...................... 83/699.1; 83/694
(58) Field of Classification Search ................ 83/746, 83/639.1, 694, 699.1
See application file for complete search history.

(56) References Cited

U.S. PATENT DOCUMENTS 3,150,551 A * 9/1964 Spengler et al. ........... 83/639.1
5,598,737 A * 2/1997 Oide ........................ 72/453.01
5,974,926 A * 11/1999 Kimura ......................... 83/451

FOREIGN PATENT DOCUMENTS

| JP | 54-134004 | 10/1979 |
| JP | 57-108827 | 7/1982 |
| JP | 62-258060 | 11/1987 |
| JP | 3005689 | 10/1994 |

* cited by examiner

*Primary Examiner*—Charles Goodman
(74) *Attorney, Agent, or Firm*—Dickstein Shapiro LLP

(57) ABSTRACT

A cutting device includes a cutter rod, and a movable cutting tool of a length greater than the diameter of the cutter rod. The movable cutting tool is prevented from cracking and breaking.

A movable cutting tool (7) has protruding parts (7b) protruding radially outward from a large-diameter part (40b) of a cutter rod (4) and having cylindrical surfaces (7c) of a cylinder of a radius equal to that of the large-diameter part (40b). The movable cutting tool (7) is attached to a flat surface (40c) formed in the cutter rod (4) with the cylindrical surfaces (7c) in close contact with the circumference of the large-diameter part (40b) of the cutter rod (4) to bear external force exerted on the protruding parts (7b) by the cutter rod (4).

2 Claims, 4 Drawing Sheets

CUTTING DEVICE

TECHNICAL FIELD

The present invention relates to a cutting device for cutting a metal plate or a metal round bar. More particularly, the present invention relates to a cutting device characterized by a movable cutting tool holding structure.

BACKGROUND ART

A cutting device that cuts a metal workpiece by sliding a movable cutting tool attached to a free end of a reciprocating rod relative to a fixed cutting tool is used widely.

FIG. 6 shows a conventional cutting device 60 by way of example in a sectional view. The cutting device 60 has a base 61, a fixed cutting tool 62 having the shape of a flat plate and fixedly held on the base 61, and a movable cutting tool 64 having the shape of a flat plate and attached to a front part of a reciprocating cutter rod 63 that reciprocates relative to the fixed cutting tool 62. The movable cutting tool 64 is slidably moved to cut a workpiece, such as a metal round bar P.

This cutting device 60 is capable of cutting not only round bars but also metal plates having a comparatively large width. The movable cutting tool 64 has a cutting edge 64a of a length greater than the diameter of the cutter rod 63.

The cutting tool 64 is applied to a longitudinal flat surface formed by longitudinally cutting a part of the front part of the cutter rod 63, and is fastened to the cutter rod 63 with bolts 65.

The cutter rod 63 is advanced by the agency of a high-pressure oil supplied through a high-pressure pipe 66 to cut the round bar P by sliding the movable cutting tool 64 relative to the fixed cutting tool 62.

DISCLOSURE OF THE INVENTION

However, when cutting the round bar P by the cutting device with only a protruding part 64b, protruding radially outward from the cutter rod 63, of the movable cutting tool 64 having the cutting edge 64a as shown in FIG. 6, a large bending moment acts on the protruding part 64b of the movable cutting tool 64. Consequently, in some cases, the movable cutting tool 64 cracks and breaks at a part corresponding to the joint of the protruding part 64b and the cutter rod 63.

The present invention has been made to solve such a problem and it is therefore an object of the present invention to provide a cutting device having a cutter rod and a flat cutting tool having a cutting edge and a length greater than the diameter of the cutter rod, and capable of preventing the cracking fracture of the movable cutting tool.

To solve the foregoing problem, the present invention provides a cutting device including: a fixed cutting tool; a reciprocating, cylindrical cutter rod having a front part having a flat surface and capable of being axially moved; a flat movable cutting tool having a cutting edge of a length greater than the diameter of the cutter rod and attached to the flat surface of the front part of the cutter rod; characterized in that the front part of the cutter rod has a small-diameter part of a small diameter and a large-diameter part of a large diameter, the flat surface is formed in the small-diameter part, cylindrical surfaces of a cylinder of a radius equal to that of the large-diameter part of the cutter rod are formed in protruding parts, protruding radially outward from the large-diameter part of the cutter rod, of the movable cutting tool, respectively, and the movable cutting tool is attached to the flat surface of the cutter rod with the cylindrical surfaces in close contact with the circumference of the cutter rod.

The cutting device of the present invention is characterized by the pair of cylindrical surfaces, and the movable cutting tool is attached to the cutter rod with its middle part in coincidence with the axis of the cutter rod.

According to the present invention, external forces acting on the protruding parts of the movable cutting tool extending radially outside the cutter rod are borne by the circumference of the cutter rod to prevent the cracking breakage of the protruding parts.

BEST MODE FOR CARRYING OUT THE INVENTION

A cutting device 10 in a preferred embodiment according to the present invention will be described in connection with the accompanying drawings.

Figure 1:
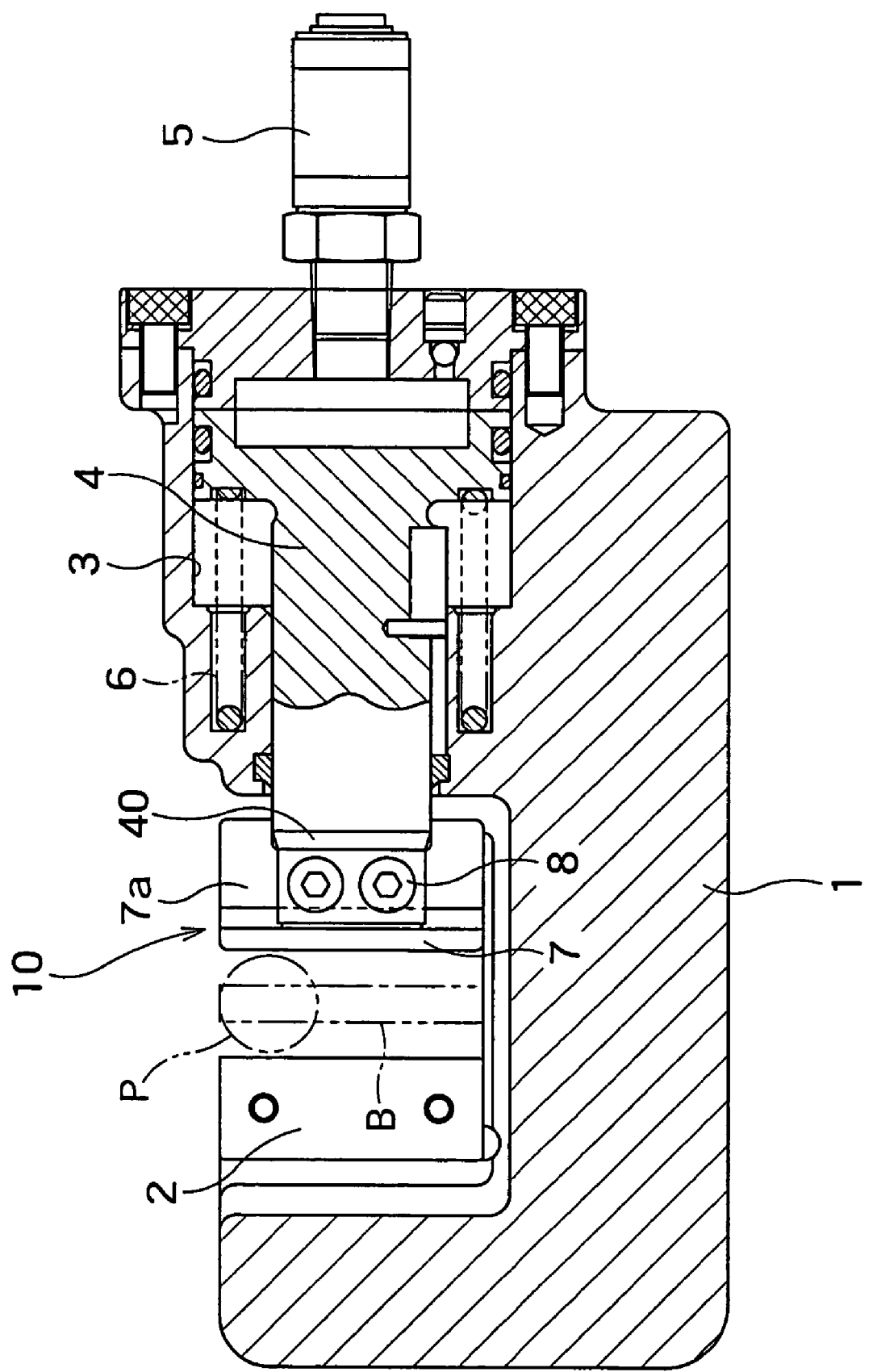
FIG. 1 is a sectional view of a cutting device in a preferred embodiment according to the present invention.
Figure 2:
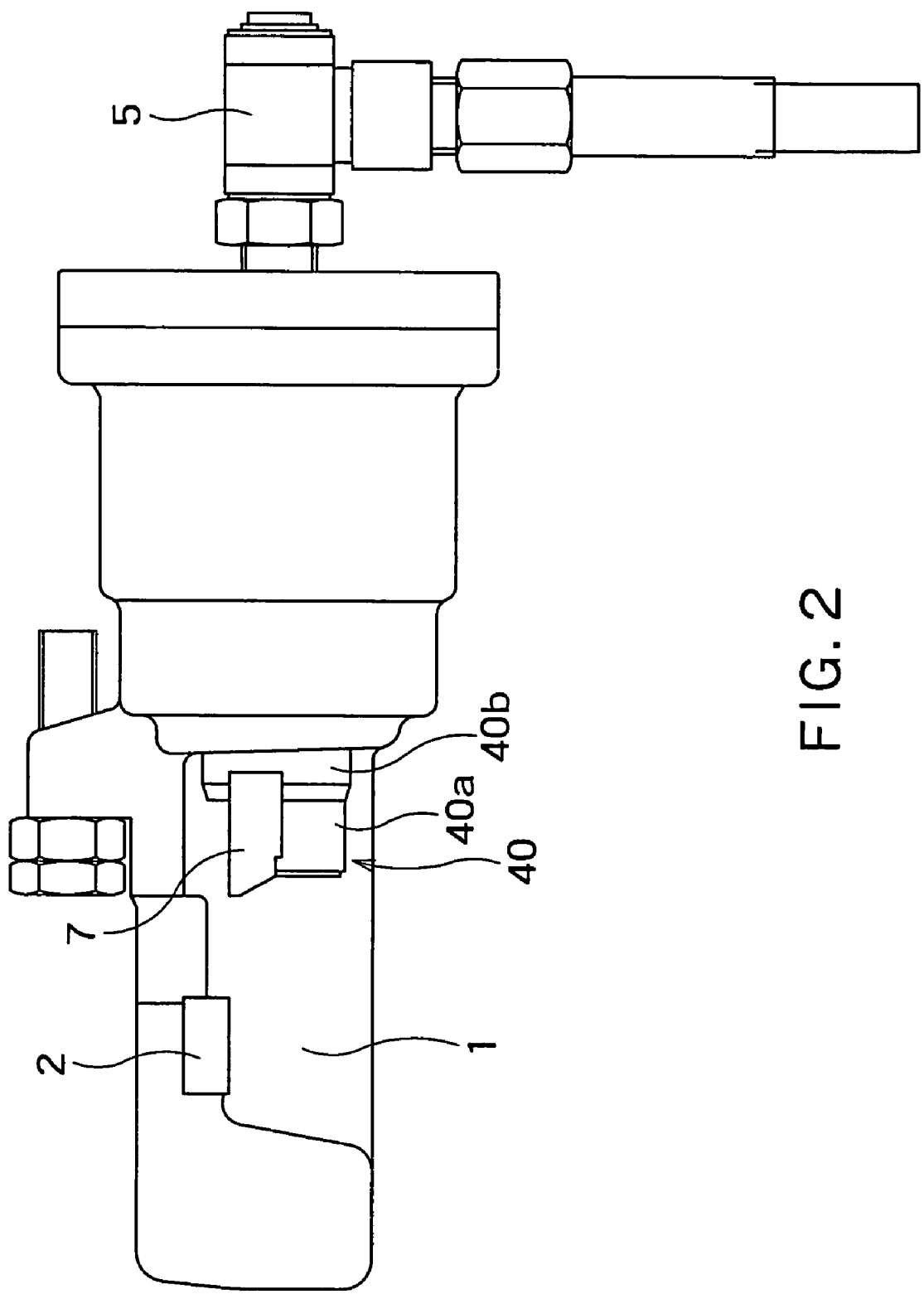
FIG. 2 is a top plan view of the cutting device shown in FIG. 1.

FIG. 1 is a sectional view of the cutting device 10 embodying the present invention, and FIG. 2 is a top plan view of the cutting device 10 shown in FIG. 1.

Referring to FIGS. 1 and 2, a flat fixed cutting tool 2 is fixedly attached to a front part of a base 1.

A cylinder 3 is formed in a back part of the base 1. A cutter rod 4 is inserted in the cylinder 3 so as to be axially movable. The cutter rod 4 is advanced by high-pressure oil supplied through a high-pressure pipe into the cylinder 3 and is retracted by a return spring 6 disposed in the cylinder 3.

Figure 3:
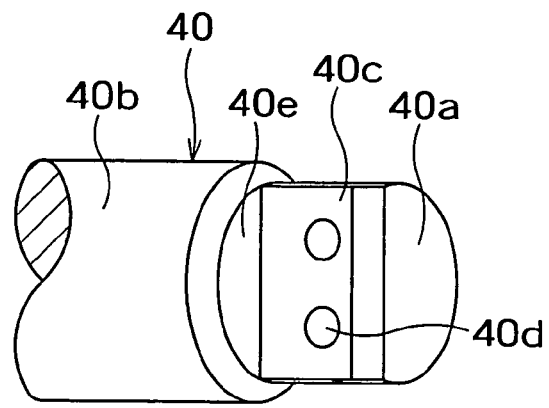
FIG. 3 is a side elevation of a front part of a cutter rod.

Referring to FIG. 3, a front part 40 of the cutter rod 4 projecting from the cylinder 3 has a small-diameter part 40a and a large-diameter part 40b. A part of the small-diameter part 40a is cut off axially to form a flat surface 40c. Through holes 40d to be used for attaching the movable cutting tool 7 to the cutter rod 4 are formed in the flat surface 40c. A flat end surface 40e is formed between the small-diameter part 40a and the large-diameter part 40b.

Figure 4:
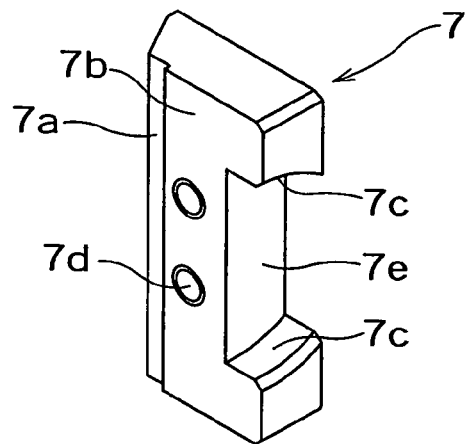
FIG. 4 is a perspective view of a movable cutting tool.

Referring to FIG. 4 showing the movable cutting tool 7 in a perspective view, the movable cutting tool 7 is formed in the shape of a flat plate and has a cutting edge 7a. The length of the cutting edge 7a is greater than the diameter of the large-diameter part 40b. The movable cutting tool 7 has protruding parts 7b protruding radially outward from the cutter rod 4. Cylindrical surfaces 7c of a cylinder of a radius equal to that of the large-diameter part 40a are formed in back end parts of the protruding parts 7b, respectively.

The cylindrical surfaces 7c are formed in a shape and dimensions such that the cylindrical surfaces 7c are in close contact with the circumference of the large-diameter part 40b of the cutter rod 4 when the movable cutting tool 7 is attached to the flat surface 40c of the cutter rod 4.

In this embodiment, the paired cylindrical surfaces are formed on the opposite sides, respectively, of the middle part of the cutting edge 7a.

Threaded holes 7d are formed in a flat part of the movable cutting tool 7 so as to coincide with the through holes 40d formed in the small-diameter part 40c of the cutter rod 4, respectively. A vertical surface 7e extends between the paired cylindrical surfaces 7c.

Figure 5:
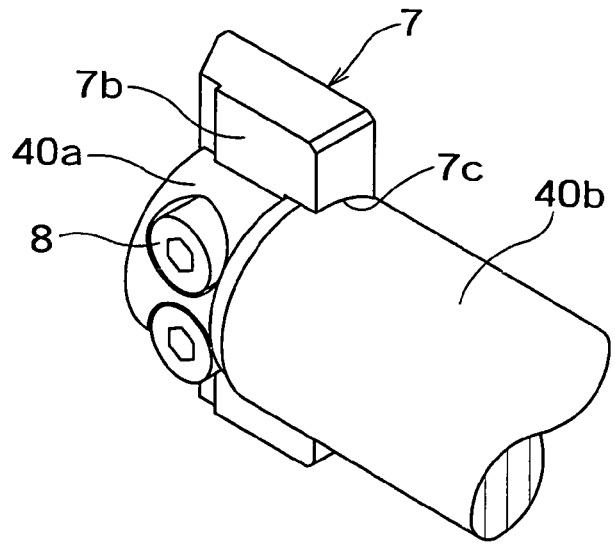
FIG. 5 is a perspective view of a movable cutting tool attached to a front part of a cutter rod.
Figure 6:
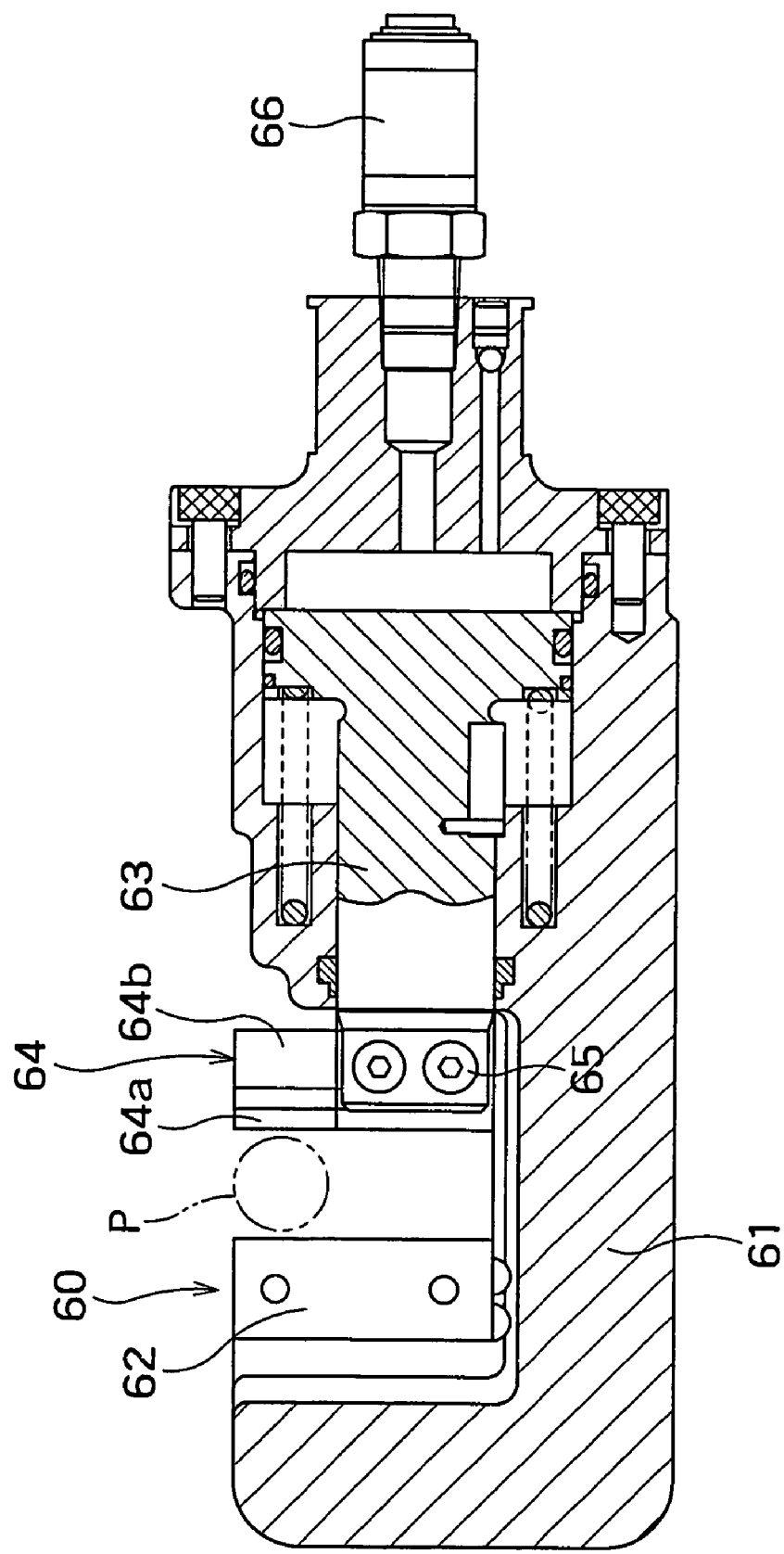
FIG. 6 is a sectional view of a conventional cutting device.

FIG. 5 is a perspective view of the movable cutting tool 7 attached to the cutter rod 4.

Bolts 8 passed through the through holes of the small-diameter part 40a are screwed in the threaded holes 7d to fasten the movable cutting tool 7 to the front part 40 of the cutter rod 4. In this state, the cylindrical surfaces 7c of the protruding parts 7b protruding radially outward from the large-diameter part 40a are in close contact with the circumference of the large-diameter part 40b, and the vertical surface 7e of the movable cutting tool 7 is in close contact with the flat end surface 40e of the front part 40 of the cutter rod 4.

The cutter rod 4 of the cutting device 10 embodying the present invention thus constructed is advanced by supplying the high-pressure oil through the high-pressure pipe 5 into the cylinder 3. Consequently, the movable cutting tool 7 slides relative to the fixed cutting tool 2 to cut a metal plate B or a metal round bar P.

When, for example, the protruding part 7b is used for cutting a round bar P as shown in FIG. 1, a large bending moment acts on the protruding part 7b. Since the cylindrical surface 7c of the protruding part 7b is in close contact with the circumference of the large-diameter part 40b of the cutter rod 4, this bending moment is borne by the large-diameter part 40b of the cutter rod 4. Consequently, the load-bearing ability of the protruding part 7b is enhanced to prevent the cracking breakage of the protruding part 7b. The vertical surface 7e in close contact with the flat end surface 40e further enhances the load-bearing ability.

In this embodiment, the movable cutting tool 7 is attached to the cutter rod 4 such that the middle part of the cutting edge 7a coincides with the axis of the cutter rod 4, and the two protruding parts 7b protrude radially outward from the cutter rod 4. The movable cutting tool 7 may have a single protruding part.

As apparent from the foregoing description, according to the present invention, the movable cutting tool has the protruding parts protruding radially outward from the large-diameter part of the cutter rod and respectively having the cylindrical surfaces, and the movable cutting tool is attached to the flat surface of the cutter rod with the cylindrical surfaces of the protruding parts in close contact with the circumference of the large-diameter part of the cutter rod. Therefore, high external force exerted on the protruding parts can be satisfactorily borne by the cutting rod and thereby the protruding parts are prevented from cracking and breaking.

The present invention is particularly effective for and applicable to a cutting device for cutting comparatively wide flat members and round bars, such as an emergency rescue device for cutting the brake pedal or the accelerator pedal of an automobile when the driver's foot is caught in the brake pedal or the accelerator pedal during an auto accident.

The invention claimed is:

1. A cutting device comprising: a fixed cutting tool; a reciprocating, cylindrical cutter rod having a front part having a flat surface and capable of being axially moved; and a flat movable cutting tool having a cutting edge of a length greater than the diameter of the cutter rod and attached to the flat surface of the front part of the cutter rod; characterized in that the front part of the cutter rod has a small-diameter part of a small diameter and a large-diameter part of a large diameter, the flat surface is formed in the small-diameter part, cylindrical surfaces of a cylinder of a radius equal to that of the large-diameter part of the cutter rod are formed in protruding parts, protruding radially outward from the large-diameter part of the cutter rod, of the movable cutting tool, respectively, and the movable cutting tool is attached to the flat surface of the cutter rod with the cylindrical surfaces in close contact with the circumference of the cutter rod.

2. The cutting device according to claim 1 characterized in that the pair of cylindrical surfaces are formed in the movable cutting tool, and the movable cutting tool is attached to the cutter rod with its middle part in coincidence with the axis of the cutter rod.

* * * * *